(12) United States Patent
Kelley

(10) Patent No.: US 7,318,533 B2
(45) Date of Patent: Jan. 15, 2008

(54) OPPOSING RIB STRUCTURE FOR NON-ROUND BOTTLES

(75) Inventor: Paul V. Kelley, Thurmont, MD (US)

(73) Assignee: Graham Packaging Company, L.P., York, PA (US)

(*) Notice: Subject to any disclaimer, the term of this patent is extended or adjusted under 35 U.S.C. 154(b) by 315 days.

(21) Appl. No.: 10/625,507

(22) Filed: Jul. 24, 2003

(65) Prior Publication Data
US 2004/0164046 A1    Aug. 26, 2004

Related U.S. Application Data

(60) Provisional application No. 60/417,656, filed on Oct. 11, 2002, provisional application No. 60/398,022, filed on Jul. 24, 2002.

(51) Int. Cl.
B65D 90/02    (2006.01)

(52) U.S. Cl. .............. 215/384; 215/381; 215/382

(58) Field of Classification Search ........... 215/379, 215/382, 384, 371, 372, 373, 374, 375
See application file for complete search history.

(56) References Cited

U.S. PATENT DOCUMENTS

| | | | |
|---|---|---|---|
| 4,863,046 A | * | 9/1989 | Collette et al. ............ 215/381 |
| D322,213 S | * | 12/1991 | Maginnis, Jr. .............. D9/602 |
| 5,123,554 A | * | 6/1992 | Arvidson et al. ........... 215/12.2 |
| 5,222,615 A | | 6/1993 | Ota et al. |
| 5,238,129 A | | 8/1993 | Ota |
| 5,337,909 A | | 8/1994 | Vailliencourt |
| 5,381,910 A | | 1/1995 | Sugiura et al. |
| D360,582 S | * | 7/1995 | McDonald et al. .......... D9/520 |
| 5,908,127 A | | 6/1999 | Weick et al. |
| D423,935 S | * | 5/2000 | Frazer ....................... D9/520 |
| 6,575,321 B2 | | 6/2003 | Bourque et al. |

FOREIGN PATENT DOCUMENTS

WO    WO 97/34808    9/1997

* cited by examiner

Primary Examiner—Tri M. Mai
(74) Attorney, Agent, or Firm—Knoble Yoshida & Dunleavy, LLC

(57) ABSTRACT

An improved blow molded plastic non-round container having rectangular sidewalls is adapted for hot-fill applications. The hot-fill container has vacuum panel reinforcement panels with rib structures located in a label mounting area on the sidewalls. In each panel, the ribs extend across the panel and are parallel to each other where the edge of one rib faces in each array faces inward and the others in the array face outward. The inward rib resists the bulge of the panel and improves bumper denting, ease of manufacture and light weigh capability.

22 Claims, 3 Drawing Sheets

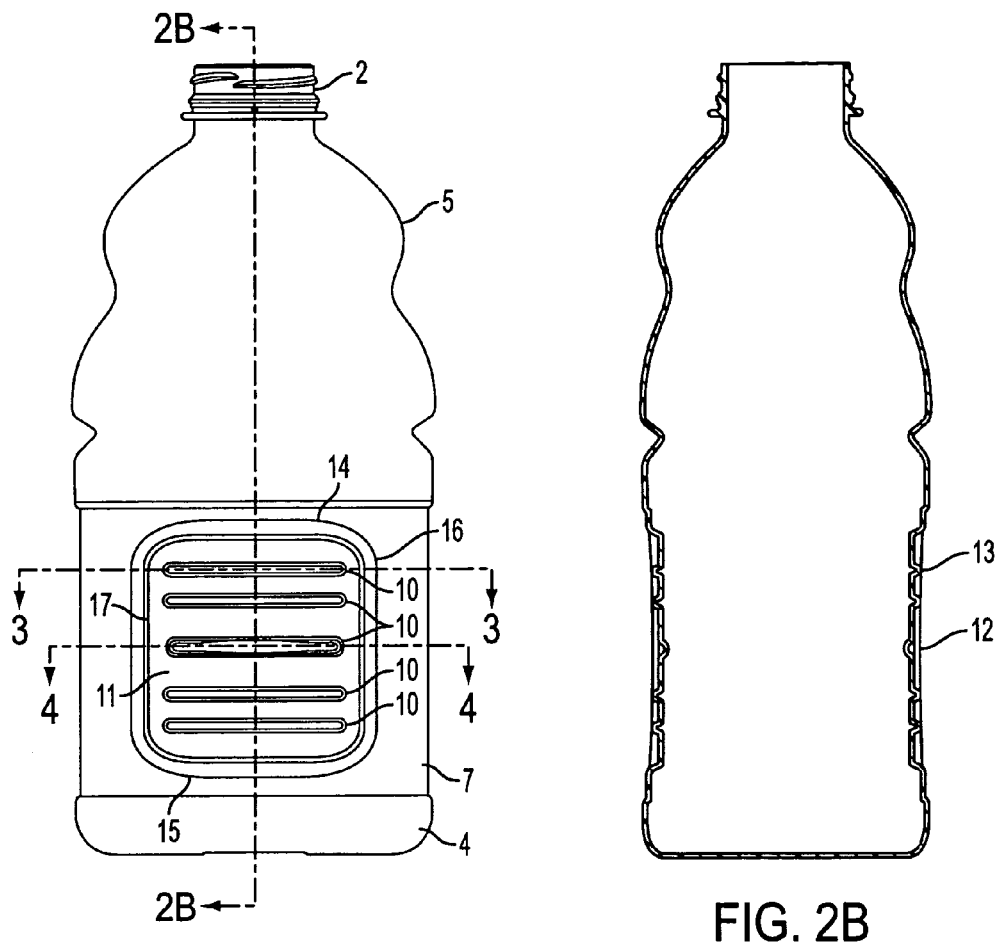
FIG. 2A
FIG. 2B
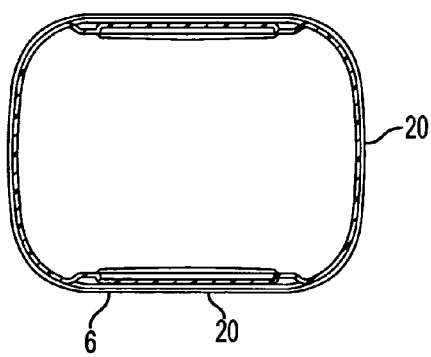
FIG. 3
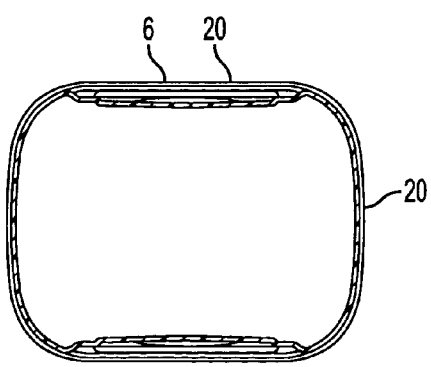
FIG. 4

OPPOSING RIB STRUCTURE FOR NON-ROUND BOTTLES

CROSS-REFERENCE TO RELATED APPLICATIONS

This application claims priority under 35 U.S.C. § 119(e)(1) of provisional applications No. 60/398,022, filed Jul. 24, 2002 and 60/417,656, filed Oct. 11, 2002.

BACKGROUND OF THE INVENTION

1. Field of the Invention

The present invention relates generally to blow-molded hot-fillable containers, and more particularly to hot-fillable containers having collapse panels.

2. Related Art

The use of blow molded plastic containers for packaging "hot-fill" beverages is well known. However, a container that is used for hot-fill applications is subject to additional mechanical stresses on the container that result in the container being more likely to fail during storage or handling. For example, it has been found that the thin sidewalls of the container deform or collapse as the container is being filled with hot fluids. In addition, the rigidity of the container decreases immediately after the hot-fill liquid is introduced into the container. As the liquid cools, the liquid shrinks in volume, which, in turn, produces a negative pressure or vacuum in the container. The container must be able to withstand such changes in pressure without failure.

Hot-fill containers typically comprise substantially rectangular vacuum panels that are designed to collapse inwardly after the container has been filled with hot liquid. However, the inward flexing of the panels caused by the hot-fill vacuum creates high stress points at the top and bottom edges of the pressure panels, especially at the upper and lower corners of the panels. These stress points weaken the portions of the sidewall near the edges of the panels, allowing the sidewall to collapse inwardly during handling of the container or when containers are stacked together. See, e.g., U.S. Pat. No. 5,337,909.

The presence of annular reinforcement ribs that extend continuously around the circumference of the container sidewall are shown in U.S. Pat. No. 5,337,909 (Vailliencourt). These ribs are indicated as supporting the vacuum panels at their upper and lower edges. This holds the edges fixed, while permitting the center portions of the vacuum panels to flex inwardly while the bottle is being filled. These ribs also resist the deformation of the vacuum panels. The reinforcement ribs can merge with the edges of the vacuum panels at the edge of the label upper and lower mounting panels.

Another hot-fill container having reinforcement ribs is disclosed in WO 97/34808 (Melrose). The container comprises a label mounting area having an upper and lower series of peripherally spaced, short, horizontal ribs separated endwise by label mount areas. It is stated that each upper and lower rib is located within the label mount section and is centered above or below, respectively, one of the lands. The container further comprises several rectangular vacuum panels that also experience high stress point at the corners of the collapse panels. These ribs stiffen the container adjacent lower corners of the collapse panels.

Although the aforementioned containers and base structures may function satisfactorily for their intended purposes, there remains a continuing need for a blow-molded plastic container having a base structure which enhances container structural integrity while requiring a minimum use of plastic. Also, these base structures need to be aesthetically pleasing and be capable of being manufactured in conventional high-speed equipment.

BRIEF SUMMARY OF THE INVENTION

The present invention provides an improved blow molded non-round plastic container that has an improved vacuum label panel ribs. The design allows for improved dent resistance, reduces container weight and improves label panel support.

The conventional rib design employed in conjunction with vacuum panels resulted in all the ribs being either inward or outward. Such a design in a non-round container with a vacuum panel on the short axis of inflation detracts from the appearance of the container, causes structural problems, excessive material use and manufacturing difficulties.

Manufacturing difficulties are caused by freeze off of material earlier in the molding process. This interferes with the efficient distribution of material in the container and causes containers to be heavier to compensate for the inefficient distribution of materials. While an all outward rib design would eliminate early contact and provide more label surface area support, it causes the vacuum panel to bulge or belly outward when the label panel bumper is contracted and forced inward by vacuum. This has the natural consequence of leaving the container prone to denting.

The present design solves these problems by combining an inward and outward rib design for the ribs positioned within the vacuum panel. The inward rib resists the bulge of the panel and improves bumper denting. The outward ribs add structure to the vacuum panel, label support and greater ease of material flow during inflation. This ease of material flow improves light weigh capability and broadens container design flexibility.

This design insures that the rectangular sides remain relatively flat which facilitates packing in box-shaped containers and the utilization of shelf when displayed in stores for retail sale. The containers are resistant to bellying out which renders them suitable for a variety of uses including hot-fill applications.

In hot-fill applications, the plastic container is filled with a liquid that is above room temperature and then sealed so that the cooling of the liquid creates a reduced volume in the container. The non-round hot-fill container of the present invention has four generally rectangular sides and a substantially rectangular base. It further comprises at least two vacuum panels located on two of the rectangular sides opposite one another. These panels have substantially curved upper and lower ends, as opposed to the substantially straight upper and lower ends. These vacuum panels also contain a series of ribs, which are parallel to each other and, preferably to the container base. These ribs have a rounded edge, which may point inward or outward relative to the interior of the container. At least one of these ribs, within each panel, has an inward edge. The remaining ribs within each panel have an outward edge. These panels and ribs are located opposite one another and, preferably each rib having an outward edge is opposite its counterpart in the opposite panel. Such a correlation enhances stability of the panel and, thereby the container.

Preferably, the ribs are substantially identical to each other in size and shape. The individual ribs can extend across the length of the panel. The actual length, width and depth of the rib may vary depending on container use, the orientation of the ribs within a panel, plastic material employed and the demands of the manufacturing process. The number of ribs within a panel may also vary. Each rib is spaced apart relative to the others within the panel to optimize its and the overall stabilization function as an inward or outward rib. Each inward facing rib within a panel has an outward rib on each side of it. The ribs within a panel are parallel to one another and preferably, also to the container base.

The novel structure of the container of the invention, including the unique structure of the vacuum panels combined with novel reinforcement means, reduces the stress placed on the comers of the vacuum panels when the panels are flexed inwardly during filling and cooling and provide additional support to the panels to resist flexing and deformation due to sealing of the container. The inward and outward ribs of the container provide dent resistance to the panel and, as a result, to the container, and also permits the manufacture of containers having less weight. The inward outward rib sequence permits the a larger label panel surface area.

In addition, the novel design of the hot-fill container also provides for additional areas on the label mounting area for receiving an adhesive or for contact with a shrink wrap label, thereby improving the process for applying a label to the container.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will become apparent from the following, more particular description of a preferred embodiment of the invention, as illustrated in the accompanying drawings wherein like reference numbers generally indicate identical, functionally similar, and/or structurally similar elements.

FIGS. 2A and 2B show side views of the container having a rectangular base from the longer and shorter sides of the base, respectively, wherein FIG. 2A illustrates the longitudinal axis with cross-sectional cuts 3-3 and 4-4;

FIG. 3 shows the cross section taken along line 3-3 of FIG. 2A

FIG. 4 shows the cross section taken along line 4-4 of FIG. 2A

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

A thin-walled container in accordance with the present invention is intended to be filled with a liquid at a temperature above room temperature. According to the invention, a container may be formed from a plastic material such as polyethylene terephthalate (PET) or polyester. Preferably, the container is blow molded. The container can be filled by automated, high speed, hot-fill equipment known in the art.

Figure 1:
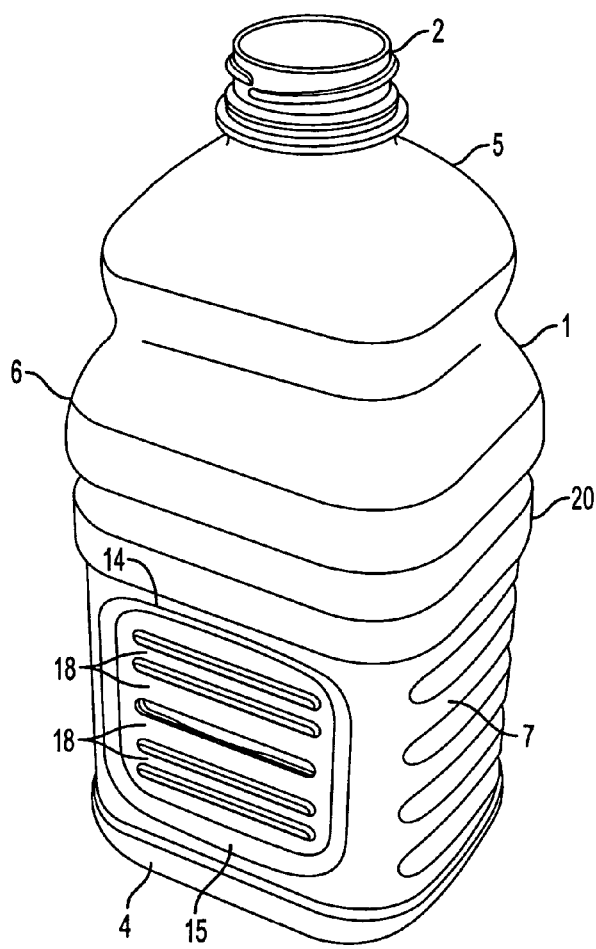
FIG. 1 shows a corner view of a three-dimensional representation of a container with rectangular side walls having ribbed vacuum panels in accordance with the present invention.
Figure 5:
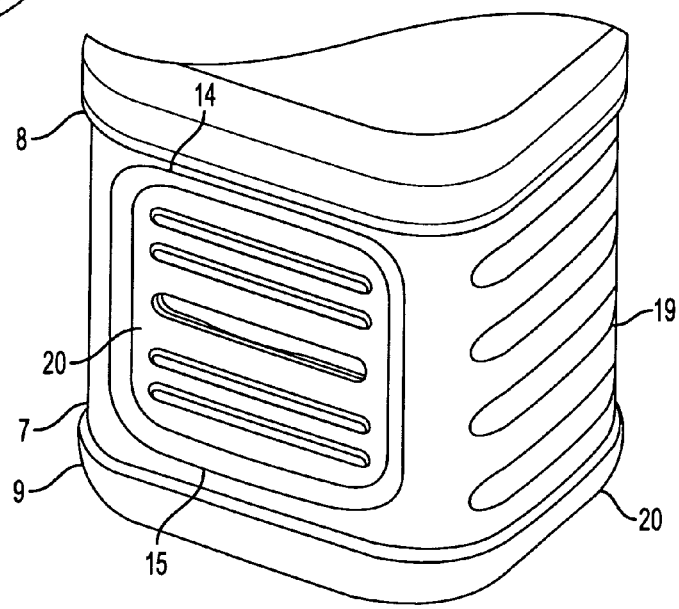
FIG. 5 shows an enlarged view of the label portion of the container having a ribbed vacuum panel where the inner most rib has an inner edge and the other shown ribs have an outer edge.

Referring now to the drawings, a preferred embodiment of the container of this invention is indicated generally in FIG. 1, as generally having many of the well known features of hot-fill bottles. The non round container (1), which is roughly a rectangular parallelepiped shape, has a longitudinal axis when the container is standing upright on its base. The container comprises a threaded neck (2) for filling and dispensing fluid. Neck (2) also is sealable with a cap (not shown). The preferred container further comprises a substantially rectangular base (4) and a shoulder (5) located below neck (2) and above base (4). The container of the present invention also has a body (6) defined by substantially rectangular sides (20) that connect shoulder (5) and base (4). The body of the preferred container has at least one label mounting area (7) that are located between upper label bumper (8) and lower label bumper (9). A label or labels can be applied to one or more of the label mounting areas using methods that are well known to those skilled in the art, including shrink wrap labeling and adhesive methods. As applied, the label extends either around the entire body of the container or extends over the entirety or a portion of the label mounting area.

Generally, two of the label mount areas are located on the rectangular sides (20) of the container opposite one another. Each of these label mounting areas comprises at least one rectangular vacuum panel (11). These vacuum panels have rounded edges. The vacuum panels permit the bottle to flex inwardly upon filling with the hot fluid, sealing, and subsequent cooling. Each panel (11) contains a series of ribs (10) which are substantially parallel to each other and the base. Each rib has a rounded outer or inner edge, relative to the space defined by the sides of the container. At least one rib, within a panel, has an inner edge (12). The remaining ribs, within the panel have outer edges (13). The positioning of the inner and outer edges relative to one another is such to maximize the function of the edge. This may can vary depending on container size, rib number, plastic composition, bottle filling conditions and expected contents. Preferably each panel has one rib with an inner edge and the others with an outer edge, where the inward facing edge is surrounded by ribs having an outward edge. The placement of inward and outward ribs within a panel can also vary so long as the desired goals associated with the interfunctioning of the inward and outward ribs is not lost.

The rectangular sides not containing vacuum panels may contain one or more ribs (19). These ribs are parallel to the base and where more than one is present parallel to each other. These ribs generally have inward edges.

The number of vacuum panels is variable, although two panels on the opposite rectangular sides of the container generally are preferred. Preferably, the vacuum panel (11) is substantially rectangular in shape and has a rounded upper edge (14), a rounded lower edge (15), substantially straight rounded side edges (16) and (17), and a panel portion (11) that is intermediate the upper and lower edges. The upper edges of the vacuum panels are spaced apart from the upper label bumper (8) (or the upper label mount area) and the lower edge of the vacuum panels are spaced apart from the lower label bumper (9) (or the lower label mount area). The vacuum panels are covered by the label once it is applied to the container.

Each rib extends longitudinally across each panel and is spaced apart from an adjacent rib by land area (18). The ribs are also spaced apart from the upper and lower edges of the vacuum panels, respectively, and are placed to maximize their function. The ribs of each series are noncontinuous, i.e., they do not touch each other. Nor do they touch a panel edge.

As shown in FIG. 2B, in a preferred embodiment there are two vacuum panels located on opposite rectangular sides of the container. Of course, the number of ribs may vary, although it is preferred that the length and configuration of each rib is substantially identically to that of the remaining ribs of the series. It is also preferred that the inward and outward ribs are positioned within a panel so that they correspond in positioning and size to their counterparts in the vacuum panel on the opposite rectangular side of the container.

As shown in FIG. 2A, the ribs preferably are parallel to each other across the individual panels. In a preferred embodiment and as depicted in FIG. 1, the inward rib is surrounded by a series of outward ribs.

Figure 6A:
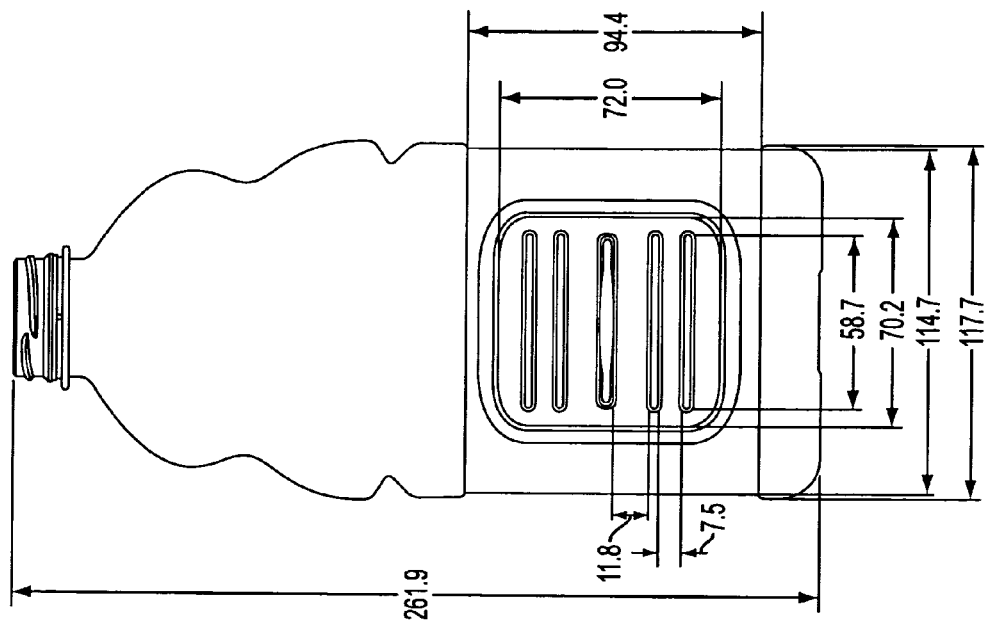
FIGS. 6A and 6B show the dimensions of a typical 64 oz. container from frontal and side view, respectively.
Figure 6B:
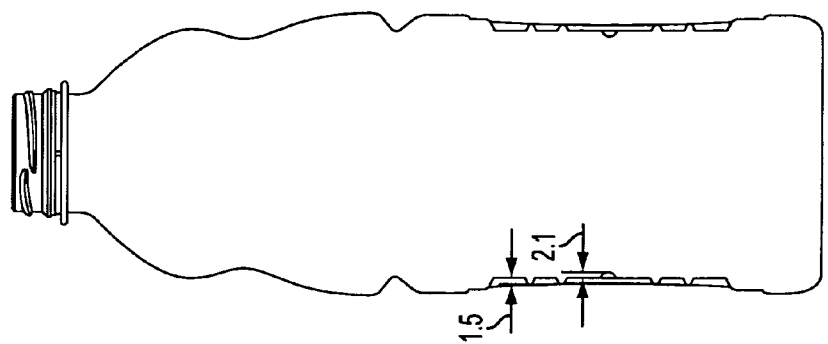

For a 64 ounce plastic container having an outer perimeter of approximately 364 mm and as depicted in FIGS. 6A and 6B, the vertical length of the label area is approximately 94 mm and the vertical length of the vacuum panels is approximately 118 mm.

FIGS. 6A and 6B show typical dimensions for a 64 oz. container. The height of the depicted container is about 262 mm. The length of the base (rectangular) is about 118 mm. The horizontal length of the frontal label area is about 115 and the vertical height is about 94 mm. The depicted recessed vacuum panel has a horizontal length of about 70 mm. and a vertical height of about 72 mm., as measured from the respective inner edges. The depicted ribs have a length of about 59 mm and a width of about 3 mm (outward facing rib) and 4 mm (inward facing rib). The distance between the ribs as depicted is about 7.5 mm. From FIG. 6B, the relative depths and heights of the inward facing and outward facing ribs can be seen, relative to the base of the recess vacuum panel base, more specifically the area between the ribs. The inward facing rib has a depth of about 2.1 mm. The outward facing rig has a height of about 1.5.

The above is offered by way of example only, and the size of the reinforcement rib is a function of the size of the container, and would be increased from the values given in proportion to an increase in the dimensions of the container from the dimensions given for container (1).

All references cited in this specification are hereby incorporated by reference. The discussion of the references herein is intended merely to summarize the assertions made by their authors and no admission is made that any reference constitutes prior art relevant to patentability. Applicant reserves the right to challenge the accuracy and pertinency of the cited references.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A thin-walled, plastic container having a body portion with rectangular sidewalls and a base wherein the body portion comprises a label mounting area, on at least two of the rectangular sidewalls, extending between an upper label bumper and a lower label bumper, the label mounting area comprising:

a rectangular vacuum panel having an upper and lower edge, said vacuum panel having a substantially flat land area, and a plurality of ribs within each panel, said ribs being spaced apart from each other along said substantially flat land area such that a portion of said substantially flat land area is positioned between adjacent ribs, each of said plurality of ribs having either an outward or inwardly projecting rounded edge relative to said substantially flat land area, wherein said ribs are parallel to each other and the non rounded base, said ribs extend from one side of the rectangular panel to the other, wherein said rounded edge of at least one of the plurality of ribs is inwardly facing and said rounded edge of at least one of the plurality of ribs is outwardly facing.

2. The plastic container of claim 1, wherein the plurality of ribs within a vacuum panel comprises an odd number of ribs.

3. The plastic container of claim 2, wherein the plurality of ribs within a vacuum panel comprises at least three ribs.

4. The plastic container of claim 2, wherein the plurality of ribs comprises at least five ribs.

5. The plastic container of claim 1, wherein the rounded edge of at least one of the plurality of rib is inwardly facing and the edges of the remaining ribs are outwardly facing.

6. The plastic container of claim 5, wherein the rib having the inwardly facing edge is an internal rib.

7. The plastic container of claim 6, wherein the rib having the inwardly facing edge has at least one adjacent rib with an outwardly facing edge.

8. The plastic container of claim 7, wherein the rib having the inwardly facing edge has at least two adjacent ribs with an outwardly facing edge.

9. The plastic container of claim 1, wherein the rectangular sidewalls having vacuum panels are opposite each other.

10. The plastic container of claim 9, wherein the ribs within the panel form a symmetrical pattern.

11. The plastic container of claim 10, wherein the symmetrical patterns in each panel are identical.

12. The plastic container of claim 1, wherein the container is made of PET.

13. The plastic container of claim 1, wherein the container is hot-fillable.

14. The plastic container of claim 1, wherein the base is non-rounded.

15. A plastic container having a body portion with rectangular sidewalls and a base wherein the body portion comprises a label mounting area extending between an upper label bumper and a lower label bumper, the label mounting area comprising:

a rectangular vacuum panel on at least two of the rectangular sidewalls, each said panel having an upper and lower edge, said vacuum panel having a substantially flat land area; and an odd-numbered plurality of ribs within each panel, said ribs being spaced apart from each other along said substantially flat land area such that a portion of said substantially flat land area is positioned between adjacent ribs, each of said plurality of ribs having either an outward or inwardly projecting rounded edge, relative to a space defined by the sidewalls, wherein said ribs are parallel to each other and the non rounded base and extend substantially from one side of the rectangular panel to the other, and wherein the rounded edge of at least one rib is inwardly facing and the edges of the remaining ribs are outwardly facing.

16. The plastic container of claim 15, wherein the plurality of ribs within a vacuum panel comprises at least three ribs.

17. The plastic container of claim 15, wherein the plurality of ribs comprises at least five ribs.

18. The plastic container of claim 15, wherein the rib having the inwardly facing edge is disposed between a pair of adjacent ribs, each of which has an outwardly facing edge.

19. The plastic container of claim 15, wherein the rectangular sidewalls having vacuum panels are opposite each other.

20. The plastic container of claim 9, wherein the ribs within the panel form a symmetrical pattern.

21. The plastic container of claim 1, wherein the thin-walled, plastic container is a hot-fill type container.

22. The plastic container of claim 15, wherein the plastic container is a hot-fill type container.

* * * * *